(12) United States Patent
Yoon et al.

(10) Patent No.: US 10,574,877 B2
(45) Date of Patent: Feb. 25, 2020

(54) MOBILE TERMINAL

(71) Applicant: LG ELECTRONICS INC., Seoul (KR)

(72) Inventors: Sumin Yoon, Seoul (KR); Sangdon Park, Seoul (KR); Seunghyun Yun, Seoul (KR); Wonmoog Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 400 days.

(21) Appl. No.: 15/312,599

(22) PCT Filed: Feb. 4, 2015

(86) PCT No.: PCT/KR2015/001160
§ 371 (c)(1),
(2) Date: Nov. 18, 2016

(87) PCT Pub. No.: WO2015/190668
PCT Pub. Date: Dec. 17, 2015

(65) Prior Publication Data
US 2017/0111570 A1    Apr. 20, 2017

(30) Foreign Application Priority Data
Jun. 10, 2014  (KR) .................. 10-2014-0070044

(51) Int. Cl.
*H04N 5/232* (2006.01)
*G06F 3/16* (2006.01)
(Continued)

(52) U.S. Cl.
CPC ......... *H04N 5/23219* (2013.01); *G06F 3/167* (2013.01); *H04B 1/3833* (2013.01);
(Continued)

(58) Field of Classification Search
CPC .............. H04N 5/23296; H04N 5/247; H04N 5/23238; H04N 5/23293; H04N 5/332;
(Continued)

(56) References Cited

U.S. PATENT DOCUMENTS 7,787,914 B2 * 8/2010 Ahn ...................... H04M 1/022
455/575.1
9,204,026 B2 * 12/2015 Jeon ..................... H04N 5/2258
(Continued)

FOREIGN PATENT DOCUMENTS

JP          11095865        4/1999
JP         2011076267       4/2011
(Continued)

OTHER PUBLICATIONS

PCT International Application No. PCT/KR2015/001160, Written Opinion of the International Searching Authority dated May 8, 2015, 15 pages.

*Primary Examiner* — Dave Czekaj
*Assistant Examiner* — Kehinde Abimbola
(74) *Attorney, Agent, or Firm* — Lee, Hong, Degerman, Kang & Waimey

(57) ABSTRACT

The present invention relates to a mobile terminal comprising: a first body unit; a second body unit; a display unit; a camera module; and a control unit, wherein when the second body unit rotationally moves toward the first body unit, if the angle between the first body unit and the second body unit is not more than a first angle and not less than a second angle, the control unit operates the camera module to photograph an image, and if the angle between the first body unit and the second body unit is less than the second angle, the control unit stops the image photographing of the camera module, and wherein when returning the second body unit so that the angle between the first body unit and the second body unit is greater than or equal to the first angle, the (Continued)

control unit displays the image photographed by the camera module on the display unit.

20 Claims, 13 Drawing Sheets

(51) Int. Cl.
- *H04N 5/247* (2006.01)
- *H04N 5/225* (2006.01)
- *H04M 1/02* (2006.01)
- *H04B 1/3827* (2015.01)

(52) U.S. Cl.
CPC ........ *H04M 1/0264* (2013.01); *H04N 5/2257* (2013.01); *H04N 5/23293* (2013.01); *H04N 5/247* (2013.01)

(58) Field of Classification Search
CPC .. H04N 13/243; H04N 13/344; H04N 13/376; H04N 13/378
See application file for complete search history.

(56) References Cited

U.S. PATENT DOCUMENTS

| | | | | |
|---|---|---|---|---|
| 9,915,974 | B2 * | 3/2018 | Yang | G06F 3/1423 |
| 2006/0274155 | A1 * | 12/2006 | Kim | H04M 1/0241 |
| | | | | 348/208.3 |
| 2007/0054636 | A1 * | 3/2007 | Ahn | H04M 1/022 |
| | | | | 455/128 |
| 2012/0013584 | A1 | 1/2012 | Senatori | |
| 2012/0105579 | A1 * | 5/2012 | Jeon | H04N 5/2258 |
| | | | | 348/38 |
| 2013/0205142 | A1 * | 8/2013 | Jung | G06F 1/1677 |
| | | | | 713/300 |
| 2014/0192017 | A1 * | 7/2014 | Yang | G06F 3/1423 |
| | | | | 345/174 |
| 2014/0192134 | A1 * | 7/2014 | Jung | G06K 9/00255 |
| | | | | 348/14.02 |

FOREIGN PATENT DOCUMENTS

| | | |
|---|---|---|
| KR | 1020060056021 | 5/2006 |
| KR | 1020140057780 | 5/2014 |

\* cited by examiner

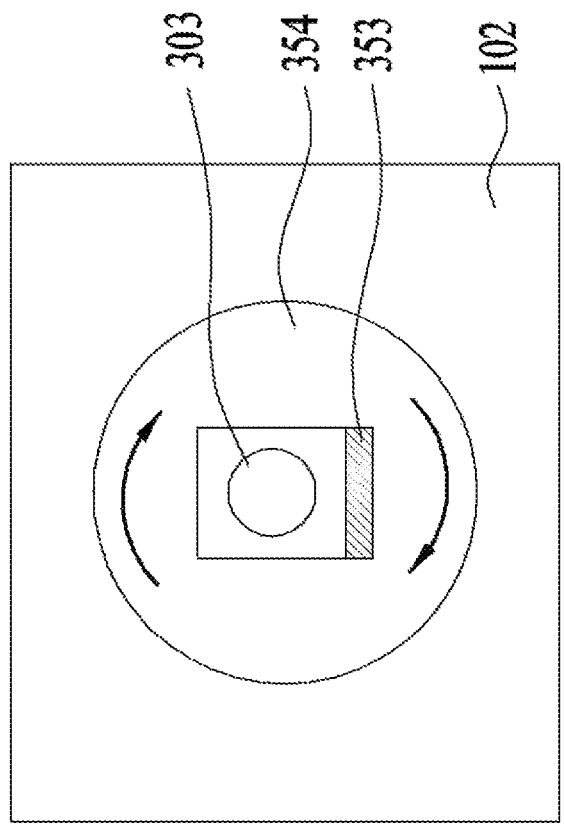

MOBILE TERMINAL

CROSS-REFERENCE TO RELATED APPLICATIONS

This application is the National Stage filing under 35 U.S.C. 371 of International Application No. PCT/KR2015/001160, filed on Feb. 4, 2015, which claims the benefit of earlier filing date and right of priority to Korean Application No. 10-2014-0070044, filed on Jun. 10, 2014, the contents of which are all hereby incorporated by reference herein in their entirety.

TECHNICAL FIELD

The present invention relates to a mobile terminal suitable for enabling implementation of a terminal use in further consideration of user's convenience.

BACKGROUND ART

Generally, terminals can be classified into mobile/portable terminals and stationary terminals. In particular, the mobile terminals can be further classified into handheld terminals and vehicle mounted terminals according to possibility of user's direct portability.

Recently, functions of a mobile terminal tend to be diversified. For instance, the diversified functions include a function of data and audio communication, a function of photographing and video-making through a camera, a function of audio recording, a function of music file play through a speaker system, a function of outputting an image or video to a display unit, and the like. A prescribed terminal is further equipped with an electronic game play function or performs a multimedia player function. Particularly, a recent mobile terminal is able to receive multicast signals for providing visual contents such as a broadcast, a video, a television program and the like.

As functions of the terminal are getting diversified, the terminal tends to be embodied into a multimedia player provided with complex functions such as photographing of photos or videos, playback of music or video files, game play, broadcast reception and the like for example.

To support and increase the terminal functions, it may be able to consider the improvement of structural parts and/or software parts of the terminal.

Thus, as a camera is installed in a mobile terminal, a photo or video can be easily taken by the mobile terminal at any time. When a user takes a selfie, since the camera is disposed in a manner of being fixed to an edge region of the mobile terminal, an upper part of a user face is taken instead of a front part of the user face due to a height difference between user's eyes staring at a mirror surface and a camera lens. Hence, it causes a problem that the selfie fails to be taken in a direction desired by the user.

In this case, if a direction of the terminal is adjusted to enable the camera lens to confront a front side of the user's face, since the user is unable to see the user's face, it may be difficult to take an accurate selfie.

Thus, since a related art mobile terminal is disposed by being fixed to an edge region of the mobile terminal, when a selfie is taken, since a user's face fails to be photographed as projected onto a mirror surface, it is inconvenient for the user to take a selfie by moving the mobile terminal in various direction and at various angles.

DISCLOSURE OF THE INVENTION

Technical Task

Accordingly, the present invention is directed to substantially obviate one or more problems due to limitations and disadvantages of the related art. One technical task of the present invention is to provide a mobile terminal, by which an image can be automatically taken by operating an image shot of a camera module within a prescribed angle range between a second body unit and a first body unit on rotating the second body unit connected to a rotating shaft.

Another technical task of the present invention is to provide a mobile terminal, by which a selfie can be taken at an appropriate angle simply and conveniently without a specific manipulation of the mobile terminal in a manner of disposing a camera module to have a prescribed tilt angle with the mobile terminal.

Technical Solutions

In one technical aspect of the present invention, provided herein is a mobile terminal, including a first body unit having a user input unit disposed therein, a second body unit configured to rotationally move by being connected to a rotating shaft of the first body unit, a display unit disposed on a front side of the second body unit, a camera module configured to capture a prescribed image by being disposed on at least one of the front side and a rear side of the second body unit, and a controller configured to control the camera module, wherein when the second body unit rotationally moves in a direction of the first body unit, if an angle between the second body unit and the first body unit is equal to or smaller than a first angle and equal to or greater than a second angle, the controller is further configured to activate an image shot of the camera module, wherein when the angle between the second body unit and the first body unit is smaller than the second angle, the controller is further configured to deactivate the image shot of the camera module, and wherein when the second body returns in order for the angle between the second body unit and the first body unit to become equal to or greater than the first angle, the controller is further configured to display an image captured by the camera module on the display unit.

Advantageous Effects

Effects of a mobile terminal according to the present invention are described as follows.

According to at least one of embodiments of the present invention, when a second body unit connected to a rotating shaft is rotated, an image can be automatically taken by operating an image shot of a camera module within a prescribed angle range between the second body unit and a first body unit, thereby providing convenience to a user.

According to at least one of embodiments of the present invention, a selfie can be taken at an appropriate angle simply and conveniently without a specific manipulation of the mobile terminal in a manner of disposing a camera module to have a prescribed tilt angle with the mobile terminal.

Additional range of applicability of the present invention will become clear from the detailed description of the invention in the following. Yet, since it will be apparent to those skilled in the art that various modifications and variations can be made therein without departing from the spirit and scope of the invention, it is to be understood that the following detailed description of the present invention and a specific embodiment such as a preferred embodiment of the present invention are exemplary and explanatory.

DESCRIPTION OF DRAWINGS

FIG. 4 is a diagram to illustrate a rotating movement of a camera module depending on an angle between first and second body units of a mobile terminal.

BEST MODE FOR INVENTION

Figure 1:
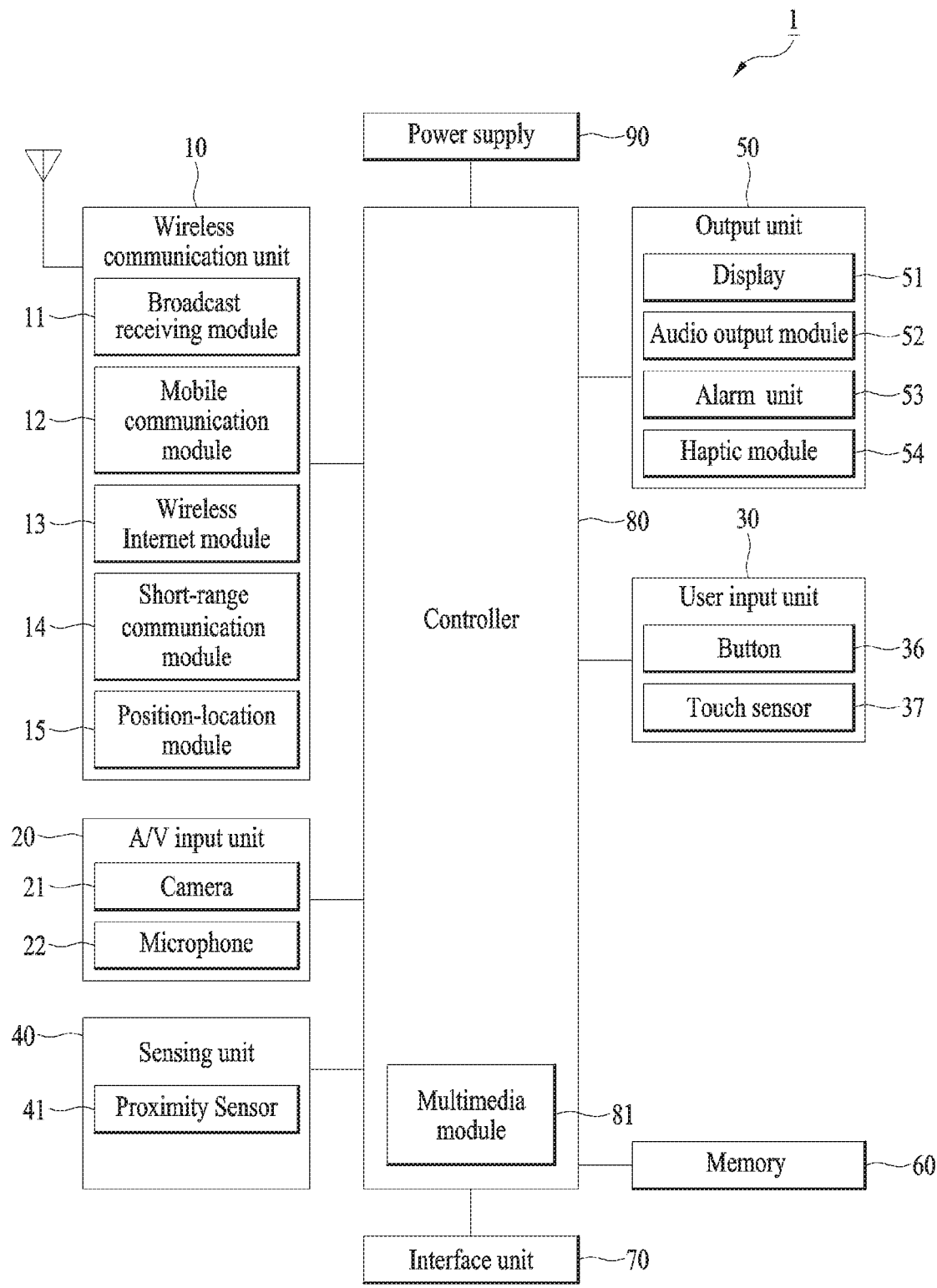
FIG. 1 is a block diagram of a mobile terminal according to one embodiment of the present invention.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a term such as "module" and "unit" may be used to refer to elements or components. Use of such a term herein is merely intended to facilitate description of the specification, and the term itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first ($1^{st}$), second ($2^{nd}$), etc. may be used herein to describe various elements, and these elements should not be limited by these terms. These terms are generally only used to distinguish one element from another.

It will be understood that when an element is referred to as being "connected with" or "accessed by" another element, the element can be directly connected with or accessed by the other element or intervening elements may also be present. In contrast, when an element is referred to as being "directly connected with" or "directly accessed by" another element, there are no intervening elements present.

A singular representation may include a plural representation unless it represents a definitely different meaning from the context.

Terms such as "comprise", "include" or "have" are used herein and should be understood that they are intended to indicate an existence of several components, functions or steps, disclosed in the specification, and it is also understood that greater or fewer components, functions, or steps may likewise be utilized. Moreover, due to the same reasons, it is also understood that the present application includes a combination of features, numerals, steps, operations, components, parts and the like partially omitted from the related or involved features, numerals, steps, operations, components and parts described using the aforementioned terms unless deviating from the intentions of the disclosed original invention.

Mobile terminals presented herein may be implemented using a variety of different types of terminals. Examples of such terminals may include cellular phones, smart phones, laptop computers, digital broadcast terminals, personal digital assistants (PDAs), portable multimedia players (PMPs), navigators, slate PCs, tablet PCs, ultrabooks, wearable devices (for example, smart watches, smart glasses, head mounted displays (HMDs)), and the like.

By way of non-limiting example only, further description will be made with reference to particular types of mobile terminals. However, such teachings apply equally to other types of stationary terminals such as digital TVs, desktop computers, digital signage players and the like.

FIG. 1 is a block diagram of a mobile terminal according to one embodiment of the present invention.

A mobile terminal 1 may include components such as a wireless communication unit 10, an input unit 20, a sensing unit 40, an output unit 50, an interface unit 70, a memory 60, a controller 80, a power supply unit 90 and the like. It is appreciated that implementing all of the components shown in FIG. 1 is not a requirement, and that greater or fewer components may alternatively be implemented.

In particular, among the above-listed components, the wireless communication unit 10 typically includes one or more modules which permit communications such as wireless communications between the mobile terminal 1 and a wireless communication system, communications between the mobile terminal 1 and another mobile terminal, communications between the mobile terminal 1 and an external server. Further, the wireless communication unit 10 typically includes one or more modules which connect the mobile terminal 1 to one or more networks.

The wireless communication unit 10 may include one or more of a broadcast receiving module 11, a mobile communication module 12, a wireless Internet module 13, a short-range communication module 14, and a location information module 15.

The input unit 20 includes a camera 21a for an image or video signal input, a microphone 22 (or an audio input unit) for an audio signal input, and a user input unit 30 (e.g., a touch key, a push key (or mechanical key), etc.) for receiving an input of information from a user. Audio or image data collected by the input unit 20 may be analyzed and processed into user's control command.

The sensing unit 40 is typically implemented using one or more sensors configured to sense internal information of the mobile terminal 1, the surrounding environment of the mobile terminal 1, user information, and the like. For example, the sensing unit 40 may include a proximity sensor 41 and an illumination sensor. If desired, the sensing unit 14 may alternatively or additionally include other types of sensors or devices, such as a touch sensor, an acceleration sensor, a magnetic sensor, a gravity sensor (G-sensor), a gyroscope sensor, a motion sensor, an RGB sensor, an infrared (IR) sensor, a finger scan sensor, a ultrasonic sensor, an optical sensor (for example, the camera 21), the microphone 22, a battery gauge, an environment sensor (for example, a barometer, a hygrometer, a thermometer, a radiation detection sensor, a thermal sensor, and a gas sensor, etc.), and a chemical sensor (for example, an electronic nose, a health care sensor, a biometric sensor, etc.), to name a few. The mobile terminal 1 disclosed in the present specification may be configured to utilize information obtained from at least two of the above-listed sensors.

The output unit 50 is typically configured to output various types of information, such as audio, video, tactile output, and the like. The output unit 50 may include at least one of a display unit 51, an audio output unit 52, a notification unit 53, a haptic module 54, and an optical output module. The display unit 51 may have an inter-layered structure or an integrated structure with a touch sensor in order to facilitate a touchscreen. The touchscreen may provide an output interface between the mobile terminal 1 and a user, as well as function as the user input unit 30 which provides an input interface between the mobile terminal 1 and the user.

The interface unit 70 serves as an interface with various types of external devices that can be coupled to the mobile terminal 1. The interface unit 70, for example, may include any of wired or wireless ports, external power supply ports, wired or wireless data ports, memory card ports, ports for connecting a device having an identification module, audio input/output (I/O) ports, video I/O ports, earphone ports, and the like. The mobile terminal 1 may perform assorted control functions associated with a connected external device, in response to the external device being connected to the interface unit 70.

Moreover, the memory 60 is typically implemented to store data to support various functions or features of the mobile terminal 1. The memory 60 may be configured to store application programs (or applications) run in the mobile terminal 1, data or instructions for operations of the mobile terminal 1, and the like. Some of these application programs may be downloaded from an external server via wireless communication. Other application programs may be installed on the mobile terminal 1 at time of manufacturing or shipping, which is typically the case for basic functions of the mobile terminal 1 (for example, receiving a call, placing a call, receiving a message, sending a message, etc.). It is common for application programs to be stored in the memory 60, installed on the mobile terminal 1, and launched by the controller 80 to perform operations (or functions) of the mobile terminal 1.

The controller 80 typically functions to control overall operations of the mobile terminal 1, in addition to the operations associated with the application programs. The controller 80 may provide or process information or functions appropriate for a user by processing signals, data, information and the like, which are inputted or outputted by the various components depicted in the above description, or running application programs stored in the memory 60.

Moreover, in order to launch an application program stored in the memory 60, the controller 80 can control at least one portion of the components described with reference to FIG. 1. Furthermore, the controller 80 controls at least two of the components included in the mobile terminal 1 to be activated in combination to launch the application program.

The power supply unit 90 can be configured to receive external power or provide internal power in order to supply appropriate power required for operating elements and components included in the mobile terminal 1. The power supply unit 90 may include a battery. In particular, the battery may include at least one of a built-in battery or a replaceable (or detachable) battery.

At least some of the components can operate cooperatively to implement the operations, controls or controlling methods of the mobile terminal 1 according to various embodiments mentioned in the following description. And, the operation, control or controlling method of the mobile terminal 1 may be implemented on the mobile terminal 1 by launching at least one application program saved in the memory 60.

Figure 2A:
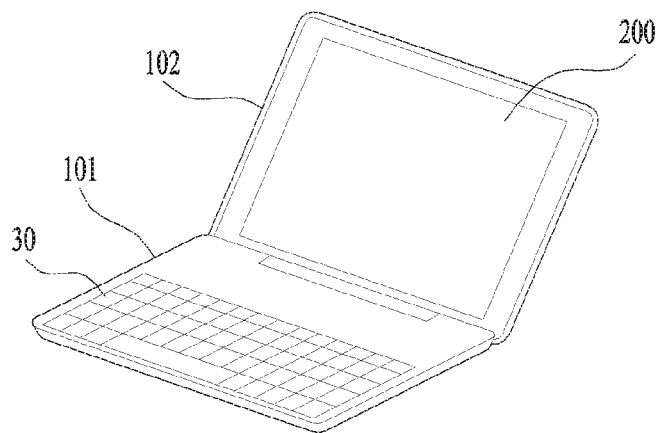
FIGS. 2A to 2C are diagrams of a mobile terminal according to one embodiment of the present invention.
Figure 2B:
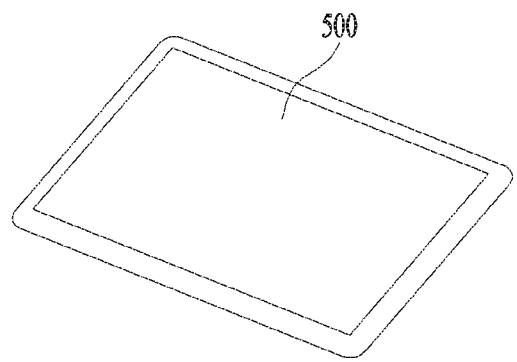
Figure 2C:
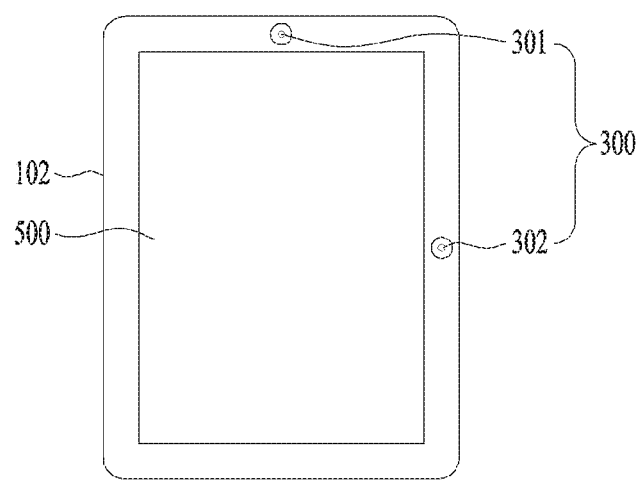

FIGS. 2A to 2C are diagrams of a mobile terminal according to one embodiment of the present invention. FIG. 2A is a perspective diagram of an open mobile terminal, FIG. 2B is a perspective diagram of a closed mobile terminal, and FIG. 2C is a layout of FIG. 2B to illustrate disposition of a camera module.

Referring to FIGS. 2A to 2C, a mobile terminal may include a first body unit 101, a second body unit 102, a user input unit 30, a display unit 200, a camera module 300, and a controller (not shown).

In particular, the user input unit 30 may be disposed in the first body unit 101, and the second body unit 102 may be rotationally move by being connected to a rotating shaft of the first body unit 101.

The display unit 200 may be disposed on a front side of the second body unit 102, and a mirror film 500 configured to project an image to be taken may be included in a rear side of the second body unit 102.

The first body unit 101 and the second body unit 102 form an exterior of the mobile terminal. The first body unit 101 and the second body unit 102 may be formed by injection molding of synthetic resin, or formed of metal material such as stainless steel (STS), titanium (Ti), and the like.

In inner spaces of the first body unit 101 and the second body unit 102, various electronic parts and the like may be installed, a controller of a circuit board type may be disposed, and a battery corresponding to a power supply unit may be disposed in a manner of being detachable from a rear side of the first body unit 101.

In the inner spaces of the first body unit 101 and the second body unit 102, a wireless communication unit including at least one of a broadcast receiving module, a mobile communication module, a wireless internet module, a short range communication module and a location information module may be disposed.

The display unit 200 may be disposed on the front side of the second body unit 102. For example, the display unit 200 may include a transparent display.

Examples of the transparent display may include at least one of a liquid crystal display (LCD), a thin film transistor-liquid crystal display (TFT-LCD), an organic light emitting diode (OLED), a flexible display, a 3-dimensional (3D) display, and the like. Some of such displays may be configured as a transparent or light-transmissive type to enable an external view therethrough.

Such a display may be called a transparent display. One representative example of the transparent display may include TOLED (Transparent OLED) or the like, which may have a rear structure of the display unit 200 configured in a light-transmissive structure as well. Owing to such a structure, a user can see a thing or object located in rear of a terminal body through a region occupied by the display unit 200 of the terminal body.

The display unit 200 may be implemented using two or more display devices, which can implement the same or different display technology. For instance, a plurality of the display units 200 may be arranged on one side, either spaced apart from each other, or these devices may be integrated, or these devices may be arranged on different surfaces, respectively.

If the display unit 200 and a touch sensor configure a mutually-layered structure or are integrally formed into one body, the display unit 200 may be used as an input device as well as an output device.

In this case, for example, if the touch sensor includes a touch film, a touch sheet, a touchpad or the like, it can configure a layered structure by being stacked on the display unit 200 or an integrated body by being included in a configuration of the display unit 200.

Subsequently, a camera module 300 is disposed on at least one of a front side and a rear side of the second body unit 102 so as to capture prescribed images.

In this case, the camera module 300 disposed on such a surface of the second body unit 102 as a mirror film may be disposed to be tilted at a tilt angle θ.

Namely, a mirror film 500 on the surface of the second body unit 102 having the tilt angle applied camera module 300 located thereat may be disposed on the same surface of the second body unit 102.

For instance, the camera module 300 may include a camera, a tilt hinge configured to adjust a slope of the camera, and a rotating fan configured to rotate the camera by being connected to the tilt hinge.

In this case, the slope of the camera may gradually increase as an angle between the second body unit 102 and the first body unit 101 decreases gradually.

The camera module 300 is controlled by the controller (not shown). When the second body unit 102 moves rotationally in a direction of the first body unit 101, if the angle between the second body unit 102 and the first body unit 101 is equal to or smaller than a first angle and equal to or greater than a second angle, the controller may control the camera module 300 to activate an image shot. If the angle between the second body unit 102 and the first body unit 101 is smaller than the second angle, the controller may control the camera module 300 to deactivate an image shot.

When the controller controls the second body unit 102 to return so that the angle between the second body unit 102 and the first body unit 101 can become equal to or greater than the first angle, the controller can display an image captured by the camera module 300 on the display unit 200.

If the second body unit 102 rotationally moves between the first angle and the second angle, the controller controls the camera module 300 to activate a video shot. If the second body unit 102 stops moving rotationally over a predetermined time, the controller may control the camera module 300 to activate a still image shot.

In doing so, in controlling the camera module 300 to operate the still image shot, the controller may control still images to be captured in predetermined time intervals.

When the second body unit 102 rotationally moves to an angle over the second angle from an angle below the first angle, if it takes a time equal to or smaller than a setup time, the controller may control the camera module 300 to cancel the image shot.

When the second body unit 102 rotationally moves to an angle over the second angle from an angle below the first angle, the controller may control the camera module 300 to activate the image shot from a timing point of starting to recognize a character's face.

When the second body unit 102 rotationally moves to an angle over the second angle from an angle below the first angle, the controller may control the camera module 300 to activate the image shot from a timing point of starting to recognize a voice for an image shot start command.

When the second body unit 102 rotationally moves to an angle over the second angle from an angle below the first angle, the controller may control the camera module 300 to activate the image shot in predetermined time intervals.

When the second body unit 102 rotationally moves to an angle over the second angle from an angle below the first angle, the controller may control the camera module 300 to activate the image shot consecutively.

The first and second angles corresponding to the rotational movement angle of the second body unit 102 may be initially set to defaults, and can be modified and set by a user as well.

Meanwhile, for example, the camera module 300 may include a first camera 302 disposed in X-axis direction in parallel with a rotating shaft of the second body unit 102 and a second camera 301 disposed in Y-axis direction vertical to the rotating shaft of the second body unit 102, by which the present invention is non-limited.

In this case, when the angle between the second body unit 102 and the first body unit 101 is the second angle, the controller can control each of the first camera 302 and the second camera 301 to activate an image shot.

In some cases, the second body unit 102 may include a gyroscope sensor. When the angle between the second body unit 102 and the first body unit 101 is the second angle, the controller may activate an image shot selected from the first camera 302 and the first camera 301 according to a sensing signal from the gyroscope sensor.

When the angle between the second body unit 102 and the first body unit 101 is the second angle, the controller may activate an image shot selected from the first camera 302 and the first camera 301 from a timing point of changing a location and direction of a face of a character or a timing point of starting to recognize a face of a new character.

And, the controller may display an image shot list captured by the camera module 300 on the display unit 200.

In this case, the controller can distinguishably display the image shot list, which is captured by the camera module 300 when the angle between the second body unit 102 and the first body unit 101 is equal to or smaller than the first angle and equal to or greater than the second angle, and the image shot list, which is captured by the camera module 300 when the angle between the second body unit 102 and the first body unit 101 is the second angle, on the display unit 200.

In some cases, when a video captured by the camera module 300 is displayed on the display unit 200, the controller may display a timing point of capturing a still image on a timeline of the video.

In other cases, the controller may selectively save some of a multitude of still images and videos according to user's editing.

Figure 3:
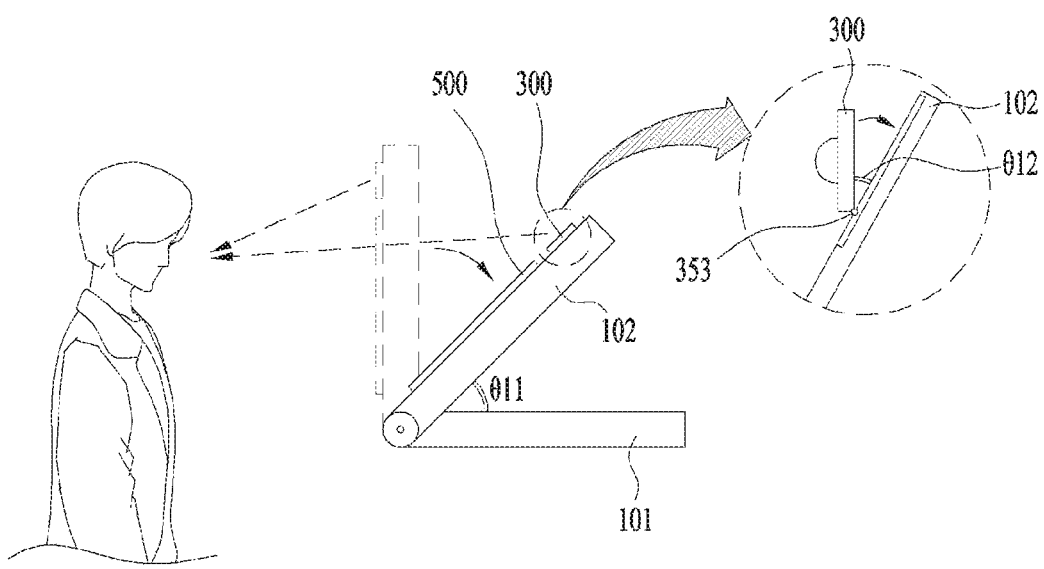
FIG. 3 is a detailed layout of a camera module shown in FIG. 2.

FIG. 3 is a detailed layout of a camera module shown in FIG. 2. And, FIG. 4 is a diagram to illustrate a rotating movement of a camera module depending on an angle between first and second body units of a mobile terminal.

Referring to FIGS. 3 and 4, the camera module 300 may include a camera 303, a tilt hinge 353 configured to adjust a slope of the camera 303, and a rotating fan 354 configured to rotate the camera 303 by being connected to the tilt hinge 353.

In this case, the camera 303 can be moved by the tilt hinge 353 so as to be tilted at a prescribed angle with a surface of the second body unit 102, or may be rotationally moved by the rotating fan 354.

In this case, the slope of the camera 303 may gradually increase as an angle between the second body unit 102 and the first body unit 101 decreases gradually.

Referring to FIG. 4, the camera module 300 is controlled by the controller. When the second body unit 102 moves rotationally in a direction of the first body unit 101, if the angle θ11 between the second body unit 102 and the first body unit 101 decreases gradually, the controller may control an angle θ12 between the camera module 300 and the second body unit 102 to further increase.

In doing so, the camera module 300 is rotationally moved by the hinge 353, whereby the angle can be adjusted.

Hence, when the second body unit 102 of the mobile terminal is closed to the first body unit 101, the camera module 300 may capture an image by adjusting the angle.

In some cases, when the second body unit 102 moves rotationally in a direction of the first body unit 101, if the angle θ11 between the second body unit 102 and the first body unit 101 decreases gradually, the controller may control the angle θ12 between the camera module 300 and the second body unit 102 to decrease gradually.

In doing so, when the second body unit 102 of the mobile terminal is closed to the first body unit 101, the camera module 300 may capture images in various directions by adjusting the angle, and can be stably seated on a camera seating portion of the second body unit 102.

Figure 5A:
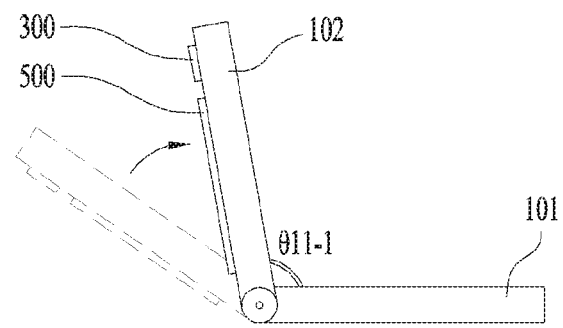
FIGS. 5A to 5C are diagrams to illustrate a method of taking an image through the mobile terminal shown in FIG. 2A.
Figure 5B:
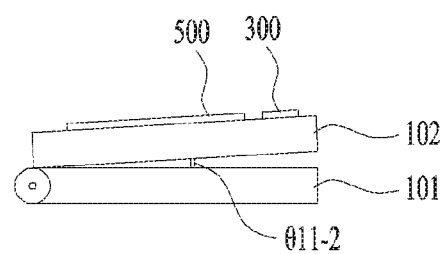
Figure 5C:
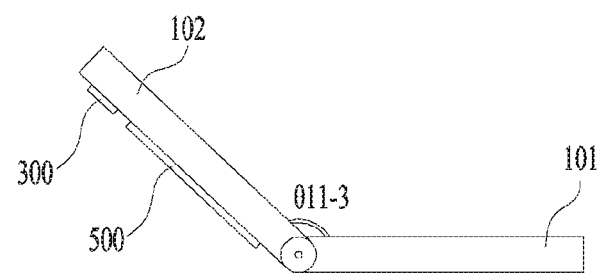

FIGS. 5A to 5C are diagrams to illustrate a method of taking an image through the mobile terminal shown in FIG. 2A.

Referring to FIGS. 5A to 5C, the second body unit 102 of the mobile terminal may rotationally move by being connected to the rotating shaft of the first body unit 101.

A display unit may be disposed on the front side of the second body unit 102 and a mirror film 500 configured to project a shot-desired image may be included in the rear side of the second body unit 102.

And, the camera module 300 is disposed on at least one of the front side, and the rear side of the second body unit 102 so as to capture a prescribed image.

Meanwhile, the camera module 300 is controlled by the controller. When the second body unit 102 moves rotationally in a direction of the first body unit 101, as shown in FIG. 5A, if an angle θ11-1 between the second body unit 102 and the first body unit 101 is equal to or smaller than a first angle and equal to or greater than a second angle, the controller may control the camera module 300 to activate an image shot.

In doing so, between the first angle and the second angle, if the second body 102 moves rotationally, the controller control the camera module 300 to activate a video shot. Between the first angle and the second angle, if the second body unit 102 stops moving rotationally for a predetermined time, the controller can control the camera module 300 to activate a still image shot.

In doing so, in controlling the camera module 300 to operate the still image shot, the controller may control still images to be captured in predetermined time intervals.

When the second body unit 102 rotationally moves to an angle over the second angle from an angle below the first angle, if it takes a time equal to or smaller than a setup time, the controller may control the camera module 300 to cancel the image shot.

When the second body unit 102 rotationally moves to an angle over the second angle from an angle below the first angle, the controller may control the camera module 300 to activate the image shot from a timing point of starting to recognize a character's face.

When the second body unit 102 rotationally moves to an angle over the second angle from an angle below the first angle, the controller may control the camera module 300 to activate the image shot from a timing point of starting to recognize a voice for an image shot start command.

When the second body unit 102 rotationally moves to an angle over the second angle from an angle below the first angle, the controller may control the camera module 300 to activate the image shot in predetermined time intervals.

When the second body unit 102 rotationally moves to an angle over the second angle from an angle below the first angle, the controller may control the camera module 300 to activate the image shot consecutively.

The first and second angles corresponding to the rotational movement angle of the second body unit 102 may be initially set to defaults, and can be modified and set by a user as well.

Subsequently, referring to FIG. 5B, if an angle θ11-2 between the second body unit 102 and the first body unit 101 is smaller than the second angle, the controller may control the camera module 300 to deactivate the image shot.

In this case, for example, if the camera module 300 includes a first camera disposed in X-axis direction in parallel with a rotating shaft of the second body unit 102 and a second camera disposed in Y-axis direction vertical to the rotating shaft of the second body unit 102, when the angle θ11-2 between the second body unit 102 and the first body unit 101 is the second angle, the controller may control both of the first and second cameras to activate image shots.

In some cases, the second body unit 102 may include a gyroscope sensor. When the angle θ11-2 between the second body unit 102 and the first body unit 101 is the second angle, the controller may activate the image shot selected from the first camera 302 and the first camera 301 according to a sensing signal from the gyroscope sensor.

When the angle θ11-2 between the second body unit 102 and the first body unit 101 is the second angle, the controller may activate an image shot selected from the first camera 302 and the first camera 301 from a timing point of changing a location and direction of a face of a character or a timing point of starting to recognize a face of a new character.

Subsequently, referring to FIG. 5C, when the controller controls the second body unit 102 to return so that an angle θ11-3 between the second body unit 102 and the first body unit 101 can become equal to or greater than the first angle, the controller can display an image captured by the camera module 300 on the display unit 200.

Namely, the controller may display an image shot list captured by the camera module 300 on the display unit.

In this case, the controller can distinguishably display the image shot list, which is captured by the camera module 300 when the angle θ11-1 between the second body unit 102 and the first body unit 101 is equal to or smaller than the first angle and equal to or greater than the second angle, and the image shot list, which is captured by the camera module 300 when the angle θ11-2 between the second body unit 102 and the first body unit 101 is the second angle, on the display unit 200.

In some cases, when a video captured by the camera module 300 is displayed on the display unit, the controller may display a timing point of capturing a still image on a timeline of the video.

In other cases, the controller may selectively save some of a multitude of still images and videos according to user's editing.

Thus, when the second body unit connected to the rotation shaft rotationally moves, the present invention can capture an image automatically by controlling the camera module to enable an image shot within a prescribed angle range between the second body unit and the first body unit, thereby providing convenience to a user.

Figure 6:
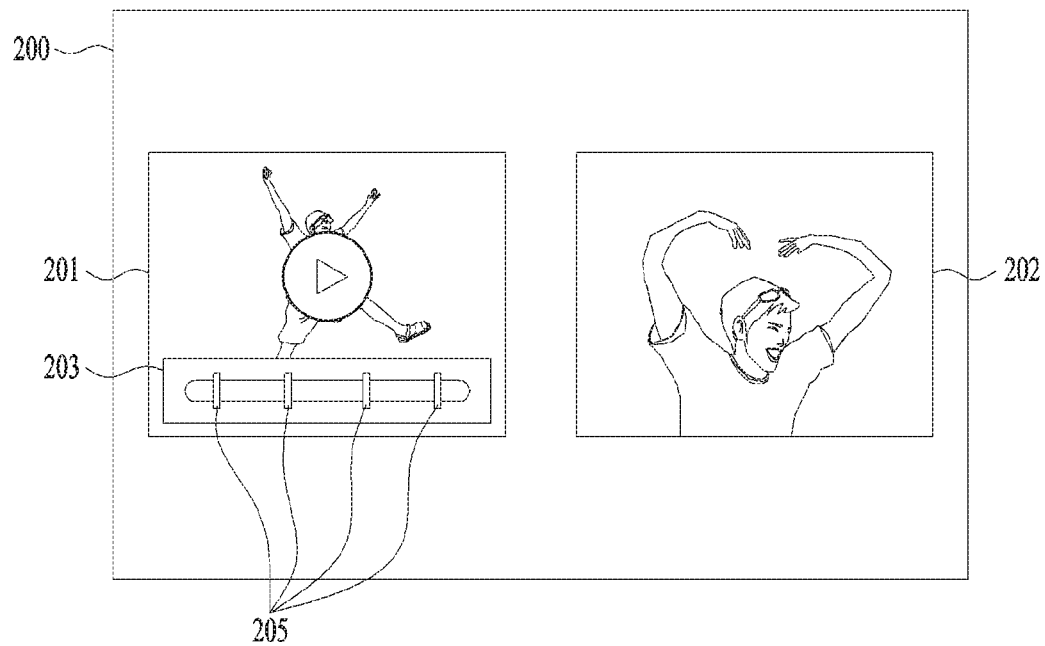
FIG. 6 and FIG. 7 are diagrams to illustrate an image shot list displayed on a display unit.
Figure 7:
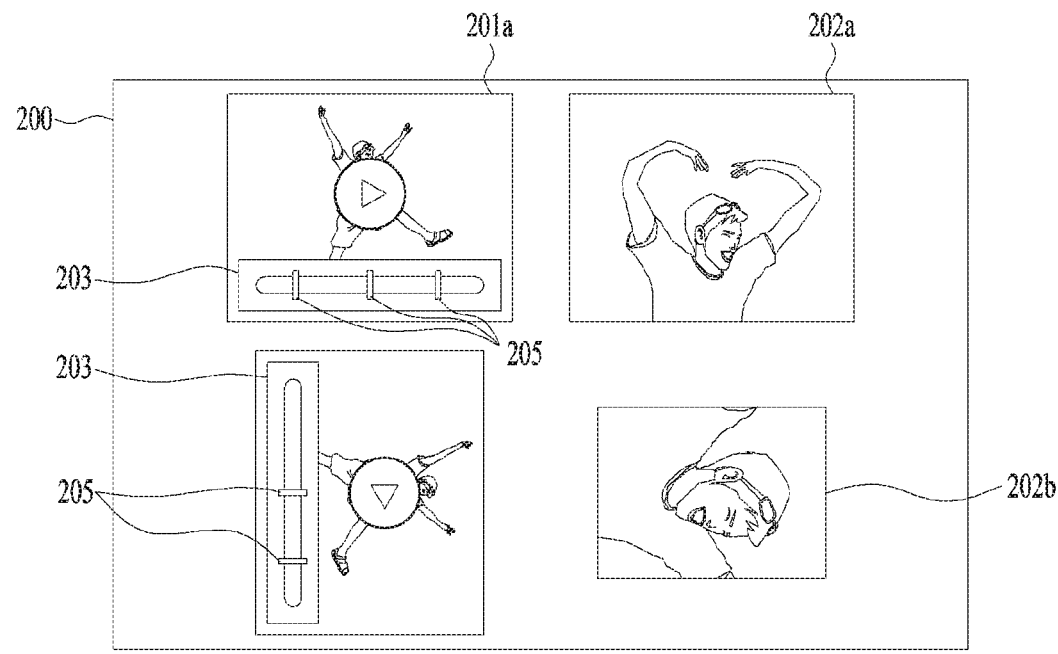

FIG. 6 and FIG. 7 are diagrams to illustrate an image shot list displayed on a display unit. FIG. 6 is an image shot list captured by a single camera, while FIG. 7 shows an image shot list captured by two cameras.

Referring to FIG. 6 and FIG. 7, when the controller controls the second body unit 102 to return so that an angle θ11-3 between the second body unit 102 and the first body unit 101 can become equal to or greater than the first angle, the controller can display an image captured by the camera module on the display unit 200.

Namely, the controller may display an image shot list captured by the camera module on the display unit 200.

In doing so, both a video 201 and a still image 202, which are captured by the camera module, can be displayed on the video the display unit 200 together.

In this case, FIG. 6 shows the video 201 and the still image 202 captured by the camera module when angle between the second body unit 102 and the first body unit 101 is equal to or smaller than the first angle and equal to or greater than the second angle.

When the video captured by the camera module is displayed on the display unit 200, the controller may display a timing point 205 of capturing a still image on a timeline 203 of the video.

Hence, the controller may selectively save some of a multitude of still images and videos according to user's editing.

And, FIG. 7 shows that the image shot list, which is captured by the camera module when the angle between the second body unit 102 and the first body unit 101 is equal to or smaller than the first angle and equal to or greater than the second angle, and the image shot list, which is captured by the camera module when the angle between the second body unit 102 and the first body unit 101 is the second angle, are displayed on the display unit 200.

For instance, when the angle between the second body unit 102 and the first body unit 101 is equal to or smaller than the first angle and equal to or greater than the second angle, the controller may display a first video 201a and a first still image 202a captured by a first camera on the display unit 200. When the angle between the second body unit 102 and the first body unit 101 is the second angle, the controller may display a second video 201b and a second still image 202b captured by a second camera on the display unit 200.

When the angle between the second body unit 102 and the first body unit 101 is the second angle, if a location and direction of a face of a character is chanted or a face of a new character is recognized, the second video 201b and the second still image 202b captured by the second camera may include images captured by the second camera, which is selectively enabled by the controller instead of the first camera, from a timing point of the change or recognition.

Thus, when the angle between the second body unit 102 and the first body unit 101 is the second angle, the controller can activate a prescribed image shot, which is selected from the first camera and the second camera, from a timing point of the change or recognition.

In this case, when the video captured by the camera module is displayed on the display unit 200, the controller may display a timing point 205 of capturing a still image on a timeline 203 of the video.

And, the controller may selectively save some of a multitude of still images and videos according to user's editing.

Figure 8A:
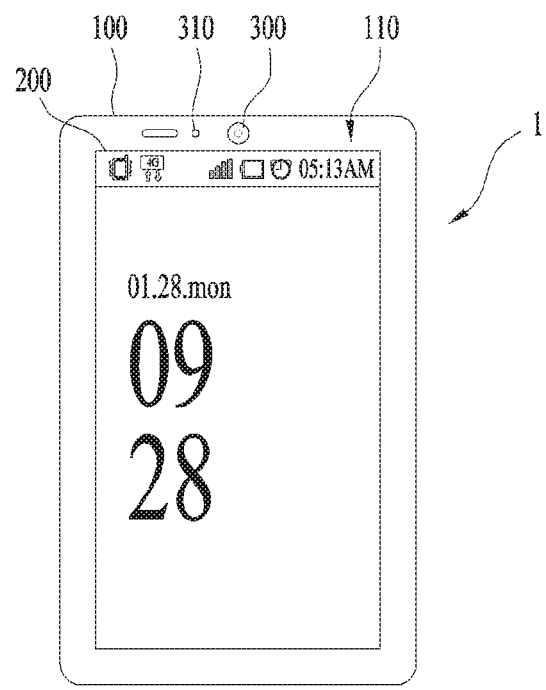
FIG. 8A and FIG. 8B are diagrams to illustrate a mobile terminal according to another embodiment of the present invention.
Figure 8B:
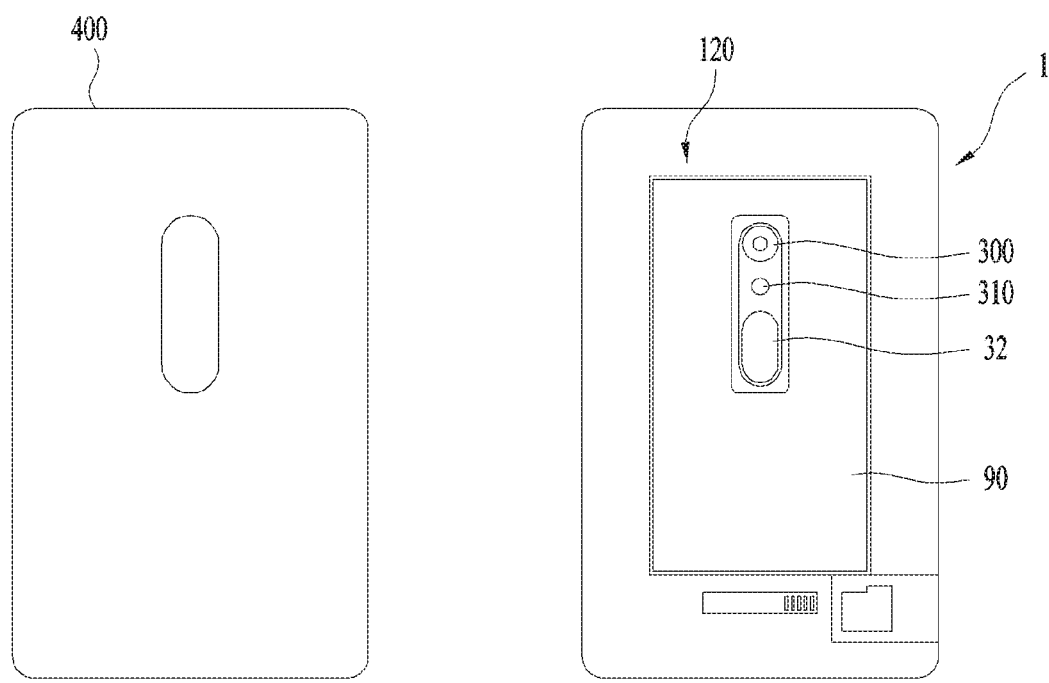

FIG. 8A and FIG. 8B are diagrams to illustrate a mobile terminal according to another embodiment of the present invention. FIG. 8A shows a front side of the mobile terminal, while FIG. 8B shows a rear side of the mobile terminal.

Referring to FIG. 8A and FIG. 8B, a mobile terminal 1 according to the present invention may include a body unit 100, a display unit 200, a cover unit 400 and a camera module 300.

In some cases, the present invention may further include a mirror film (not shown) configured to project a shot-desired image by being disposed on at least one of the display unit 200 and the cover unit 400.

In this case, the camera module 300 disposed on such a surface of the body unit 100 as a mirror film may be disposed to be tilted at a tilt angle θ.

Namely, a mirror film 500 on the surface of the body unit 100 having the tilt angle applied camera module 300 located thereat may be disposed on the same surface of the body unit 100 together.

The body unit 100 forms an exterior of the mobile terminal 1. The body unit 100 may be formed by injection molding of synthetic resin, or formed of metal material such as stainless steel (STS), titanium (Ti), and the like.

In an inner space of the body unit 100, various electronic parts and the like may be installed, a controller of a circuit board type may be disposed, and a battery corresponding to a power supply unit may be disposed in a manner of being detachable from a rear side of the body unit 100.

In the inner space of the body unit 100, a wireless communication unit including at least one of a broadcast receiving module, a mobile communication module, a wireless internet module, a short range communication module and a location information module may be disposed.

A display unit 200, a flash 310, a camera module 300 and the like may be disposed on a front side 1100 of the body unit 100.

In this case, for example, the display unit 200 may include a transparent display disposed on a front center of the body unit 100.

Examples of the transparent display may include at least one of a liquid crystal display (LCD), a thin film transistor-liquid crystal display (TFT-LCD), an organic light emitting diode (OLED), a flexible display, a 3-dimensional (3D) display, and the like. Some of such displays may be configured as a transparent or light-transmissive type to enable an external view therethrough.

Such a display may be called a transparent display. One representative example of the transparent display may include TOLED (Transparent OLED) or the like, which may have a rear structure of the display unit 200 configured in a light-transmissive structure as well. Owing to such a structure, a user can see a thing or object located in rear of a terminal body through a region occupied by the display unit 200 of the terminal body.

The display unit 200 may be implemented using two or more display devices, which can implement the same or different display technology. For instance, a plurality of the display units 120 may be arranged on one side of the mobile terminal 1, either spaced apart from each other, or these devices may be integrated, or these devices may be arranged on different surfaces, respectively.

If the display unit 200 and a touch sensor configure a mutually-layered structure or are integrally formed into one body, the display unit 200 may be used as an input device as well as an output device.

In this case, for example, if the touch sensor includes a touch film, a touch sheet, a touchpad or the like, it can configure a layered structure by being stacked on the display unit 200 or an integrated body by being included in a configuration of the display unit 200.

Subsequently, the camera module 300, the flash 310, a user input unit 32 and a power supply unit 90 may be disposed on the rear side 120 of the body unit 100. The user input unit 32 is manipulated to receive an input of a command for controlling an operation of the mobile terminal 1, and may include a plurality of manipulating units. The manipulating units may be commonly called manipulating portions, and may employ any manners corresponding to a tactile manner capable of enabling user's manipulations with a tactile sense.

In this case, the manipulating unit corresponding to the user input unit 32 may receive an input of a command such as a volume adjustment of sound outputted from an audio output unit, a switching to a touch recognition mode of the display unit 200, or the like.

The battery corresponding to the power supply unit 90 is configured to supply power to the mobile terminal 1. The battery may be installed within the body unit 100 or the mobile terminal 1, or detachably attached to the body unit 100 of the mobile terminal 1.

The cover unit 400 is disposed so as to cover the rear side 120 of the body unit 100, and configured to be detachable from the body unit 100 of the mobile terminal 1.

Meanwhile, the camera module 300 is disposed on an edge region of at least one of the front side 100 and the rear side 120 of the body unit 100 so as to capture a prescribed image.

In this case, the camera module 300 may be disposed to have a prescribed tilt angle θ with a surface of the body unit 100. And, the tilt angle θ may be found through 'tan$^{-1}$ b/a'.

In this case, 'a' indicates a distance from a first line vertical to the surface of the body unit 100 by passing through a center point of the front side 110 of the rear side 120 of the body unit 100 to a second line in parallel with the first line by passing through a center point of the camera module 300. And, 'b' is a distance between a location of a shot-desired image and the front side 110 or the rear side 120 of the body unit 100.

Figure 9:
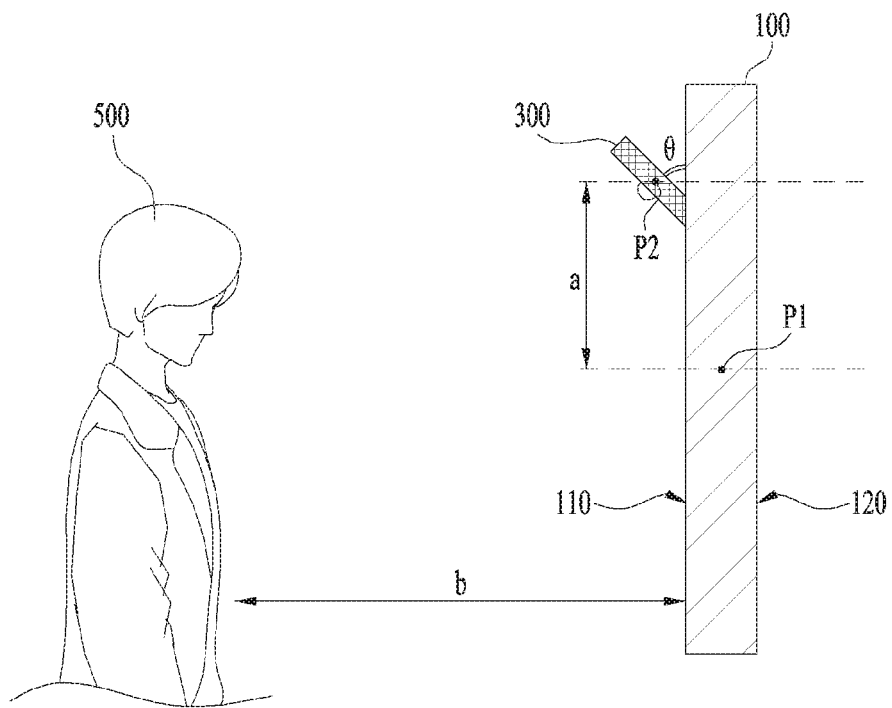
FIG. 9 is a diagram to describe a formula for calculation of a tilt angle of a camera module.
Figure 10A:
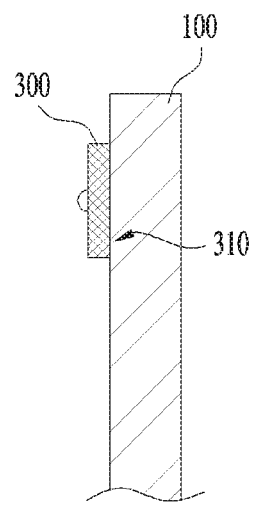
FIG. 10A and FIG. 10B are lateral-view diagrams to illustrate a camera module depending on whether a tilt angle is applied.
Figure 10B:
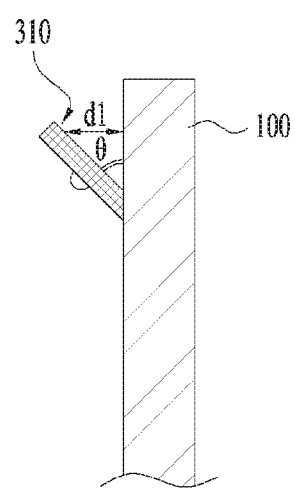

FIG. 9 is a diagram to describe a formula for calculation of a tilt angle of a camera module. FIG. 10A and FIG. 10B are lateral-view diagrams to illustrate a camera module depending on whether a tilt angle is applied. FIG. 10A is a diagram to illustrate a camera module to which a tile angle is not applied, while FIG. 10A is a diagram to illustrate a camera module to which a tile angle is applied.

Referring to FIGS. 9 to 10B, the camera module 300 may be disposed to have a prescribed tilt angle θ with the surface of the body unit 100.

In this case, the tilt angle θ may be found by Formula 1 in the following.

Formula 1

Tile angle θ=tan b/a (where, 'a' indicates a distance from a first line L1 vertical to the surface of the body unit 100 by passing through a center point P1 of the front side 110 of the rear side 120 of the body unit 100 to a second line L2 in parallel with the first line L1 by passing through a center point C2 of the camera module 300 and 'b' is a distance between a location of a shot-desired image 500 and the front side 110 or the rear side 120 of the body unit 100.)

In this case, the camera module 300 includes a bottom side 310 confronting the body unit 100. One side of the bottom side 310 of the camera module 300 comes in contact with the body unit 100, and the other side may be disposed to have a first distance dl from the body unit 100.

In particular, the first distance dl may get distant gradually toward the other side from one side of the bottom side 310 of the camera module 300.

Hence, an angle between the surface of the body unit 100 and the bottom side 310 of the camera module 300 confronting the body unit 100 may include the tilt angle θ.

In Formula 1 for finding the tilt angle θ, the distance b between the location of the shot-desired image 500 and the front side 100 or the rear side 120 of the body unit 100 may correspond to a length of a user's arm in case of taking a selfie.

Hence, the tilt angle θ may be variable depending on a length of the user's arm, a size of the mobile terminal and a location of the camera module.

Thus, the reason for disposing the camera module 300 to be tilted at a prescribed tile angle is described as follows. First of all, since the camera is disposed not at the center of the mobile terminal but at the edge region of the mobile terminal, a user face fails to be captured in a front direction due to a height difference between user's eyes staring at the center of the mobile terminal and a camera lens. Hence, the reason is to correct a height difference between the center of the mobile terminal and the camera.

Therefore, in order to correct the height difference between the center of the mobile terminal and the camera, a user can take a selfie at an appropriate angle conveniently and simply without specific manipulation.

FIGS. 11 to 13B are diagrams to illustrate embodiments of a fixed tilt angle of a camera module.

Figure 11:
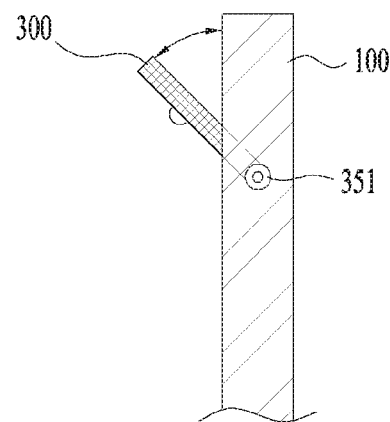
FIGS. 11 to 13B are diagrams to illustrate embodiments of a fixed tilt angle of a camera module.

Referring to FIG. 11, when the camera module 300 is disposed to be tilted, the present invention can directly move the camera module 300.

In doing so, one side of the camera module 300 may be connected to the body unit 100 through a hinge 351.

Hence, when the camera module 300 is disposed to be tilted, the camera module 300 may be rotationally moved by the hinge 351 in order to enable an angle between the bottom side of the camera module 300 and the surface of the body unit 100 to have a tilt angle θ.

Figure 12:
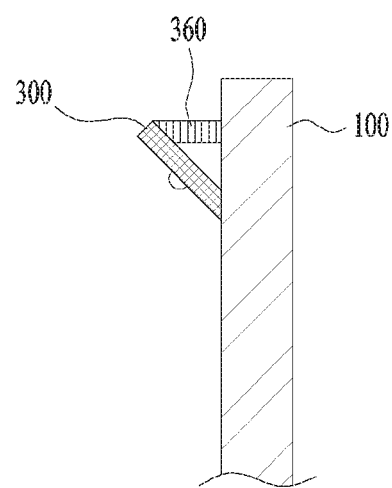

In some cases, referring to FIG. 12, according to the present invention, a supporter 360 configured to support the camera module 300 may be disposed between the surface of the body unit 100 and the bottom side of the camera module 300.

In this case, the supporter 360 may be adhesively fixed to the surface of the body unit 100 and the bottom side of the camera module 300.

Figure 13A:
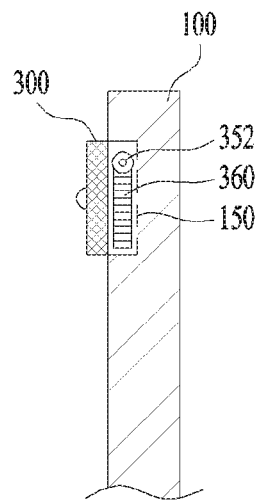
Figure 13B:
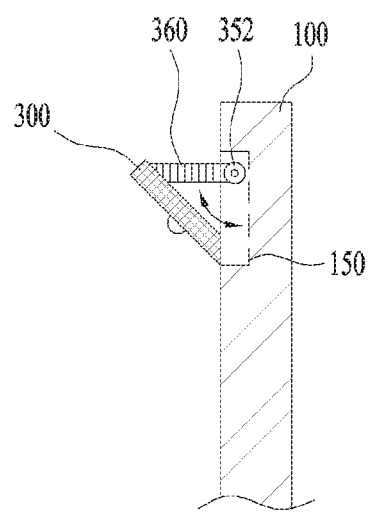

In another case, referring to FIG. 13A and FIG. 13B, the supporter 360 is rotationally moved in a manner that one side of the supporter 360 is connected to the body unit 100 through a hinge 352 so as to dispose the camera module 300 to be tilted, thereby supporting and fixing the bottom side of the camera module 300.

Referring to FIG. 13A, if a tilt angle is not applied to the camera module 300, the supporter 360 is disposed within an installation recess 150 of the body unit 100. Yet, referring to FIG. 13B, when the camera module 300 is disposed to be tilted by applying a tilt angle to the camera module 300, the supporter 360 is externally exposed from an inside of the installation recess 150 of the body unit 100 owing to the rotational movement by the hinge 352 of the supporter 360, thereby supporting the camera module 300.

Thus, according to the embodiments shown in FIGS. 11 to 13B, since a tilt angle of a camera module needs to be fixed, it can be set in consideration of an averaged arm length of an age group of using mobile terminals.

FIGS. 14A to 16 are diagrams to illustrate embodiments of adjusting a tilt angle of a camera module.

Figure 14A:
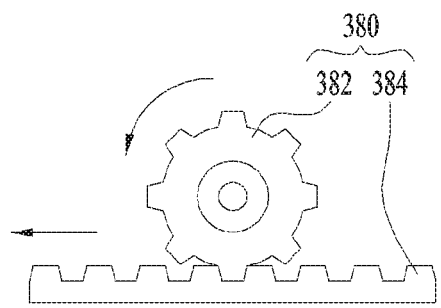
FIGS. 14A to 16 are diagrams to illustrate embodiments of adjusting a tilt angle of a camera module.
Figure 14B:
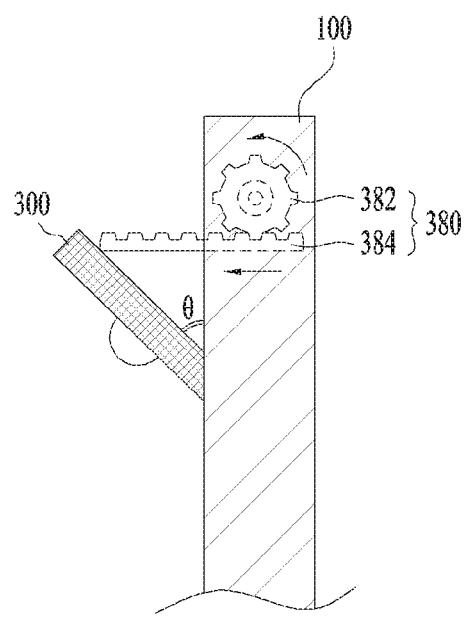
Figure 15:
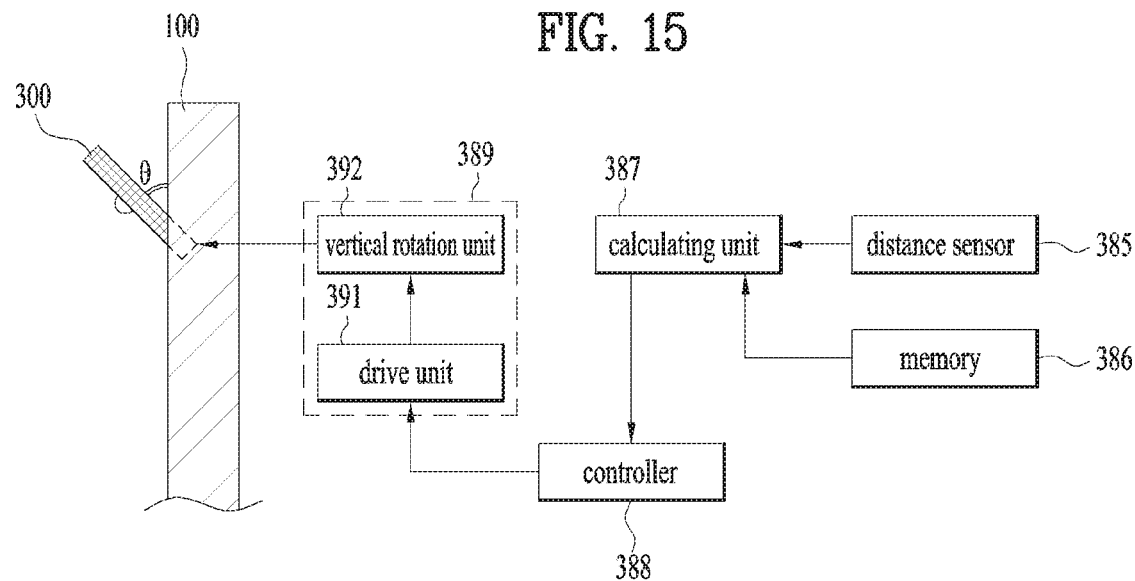
Figure 16:
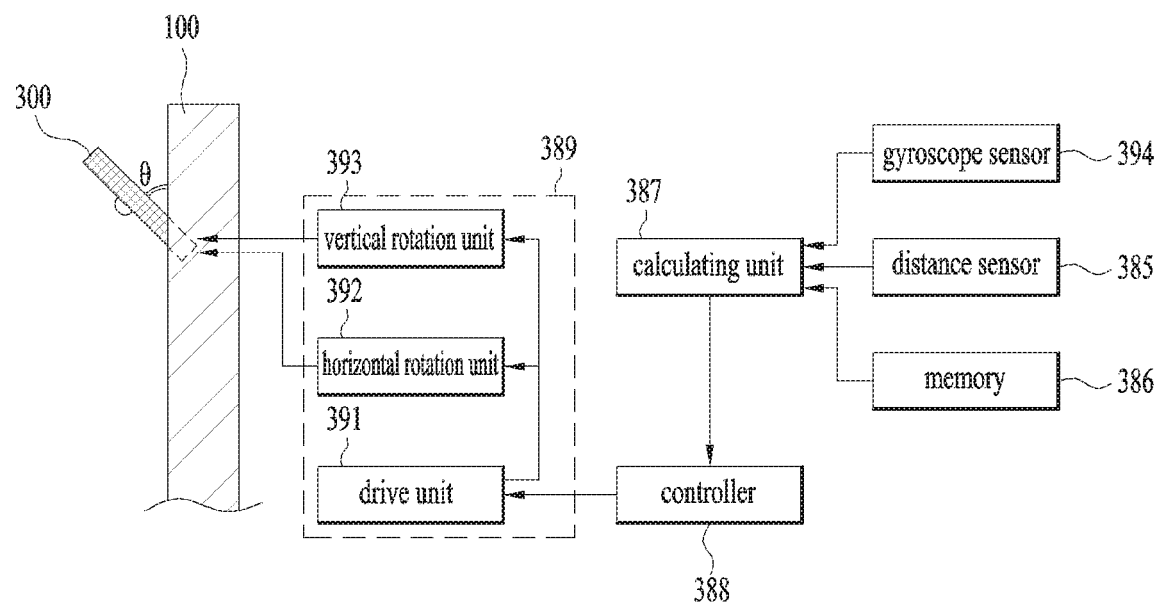

In particular, FIG. 14A and FIG. 14B show an embodiment of adjusting a tilt angle of a camera module mechanically, and FIG. 15 and FIG. 16 show embodiments of adjusting a tilt angle of a camera module electrically.

Referring to FIGS. 14A to 16, the present invention may further include a tilt angle adjusting unit 380 configured to adjust a tilt angle θ of a camera module 300 by being connected to the camera module 300.

In this case, the tile angle adjusting unit 380 may adjust the tilt angle θ of the camera module into several steps according to a distance 'b' between a location of a shot-desired image and a front or rear side of the body unit.

Although the tilt angle adjusting unit can be manufactured using mechanical gears such as a pinion member 382, a rack member 384 and the like, as shown in FIG. 14A, it may use gears of various types as well.

For example, as shown in FIG. 14B, the pinion member 382 is disposed within the body unit 100 and rotated by an external force. The rack member 384 supports the camera module 300 and is able to adjust the tilt angle θ of the camera module 300 by moving to be received within the body unit 100 or projected output of the body unit 100 in response to a rotation of the pinion member 382.

Referring to FIG. 15, a tilt angle adjusting unit may be able to automatically adjust a tilt angle of the camera module 300 using an electrical circuit. The tilt angle adjusting unit may include a distance sensor 385, a memory 386, a calculating unit 387, a transport unit 389 and a controller 388.

In this case, the distance sensor 385 may sense a distance b between a location of a shot-desired image and a front or rear side of the body unit.

The memory 386 may store a distance a between a first line vertical to a surface of the body unit 100 by passing through a center point of the front or rear side of the body unit 100 and a second line in parallel with the first line by passing through a center point of the camera module 300.

In response to a control signal of the controller 388, the calculating unit 387 is able to calculate a tilt angle θ based on the distance b sensed by the distance sensor 385 and the distance a stored in the memory 386 in advance.

The controller 388 may control the transport unit 389 to dispose the camera module 300 to be tilted according to the tilt angle θ calculated by the calculating unit 387.

In this case, the transport unit 389 may include a vertical rotation unit 392 rotating the camera module 300 vertically and a drive unit 391 driving the vertical rotation unit 392 in response to a control signal of the controller 388.

Referring to FIG. 16, a tilt angle adjusting unit can automatically adjust a tilt angle of the camera module 300 using an electrical circuit, and may include a gyroscope sensor 394, a distance sensor 385, a memory 386, a calculating unit 387, a transport unit 389 and a controller 388.

In this case, the gyroscope sensor 394 senses a tilt of a front or rear side of the body unit 100 and a direction of the tilt, and the distance sensor 385 may sense a distance b between a location of a shot-desired image and the front or rear side of the body unit.

The memory 386 may store a distance a between a first line vertical to a surface of the body unit 100 by passing through a center point of the front or rear side of the body unit 100 and a second line in parallel with the first line by passing through a center point of the camera module 300.

In response to a control signal of the controller 388, the calculating unit 387 is able to calculate a tilt angle θ based on the distance b sensed by the distance sensor 385 and the distance a stored in the memory 386 in advance.

The controller 388 may control the transport unit 389 to dispose the camera module 300 to be tilted according to the tilt angle θ calculated by the calculating unit 387 and the tilt of the body unit 100 and the tilt direction sensed by the gyroscope sensor 394.

In this case, the transport unit 389 may include a horizontal rotation unit 393 rotating the camera module 300 horizontally, a vertical rotation unit 392 rotating the camera module 300 vertically and a drive unit 391 driving the horizontal rotation unit 393 and the vertical rotation unit 392 in response to a control signal of the controller 388.

Thus, according to the embodiments shown in FIGS. 14 to 16, since a tilt angle of a camera module can be automatically adjusted, such embodiments can be reflected by various physical conditions of all age groups using mobile terminals and various types of mobile terminals, whereby the present invention can cover a wide applicability range.

Therefore, the present invention disposes a camera module to have a prescribed tilt angle with a mobile terminal, thereby taking a selfie at an appropriate angle simply and conveniently without specific manipulations of the mobile terminal.

MODE FOR INVENTION

A mobile terminal according to the present invention may be non-limited by the configurations and methods of the embodiments mentioned in the foregoing description. And, the embodiments mentioned in the foregoing description can be configured in a manner of being selectively combined with one another entirely or in part to enable various modifications.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

The present invention relates to a mobile terminal suitable for enabling implementation of a terminal use in further consideration of user's convenience. Therefore, the present invention has industrial applicability.

What is claimed is:

1. A mobile terminal, comprising:
a first body unit having a user input unit disposed therein;
a second body unit configured to rotationally move by being connected to a rotating shaft of the first body unit;
a display unit disposed on a front side of the second body unit;

a camera module configured to capture a prescribed image by being disposed on a rear side of the second body unit; and a controller configured to control the camera module, wherein the camera module comprises:

a camera;

a tilt hinge configured to adjust a tilt of the camera by rotating with respect to a first axis parallel to the rotating shaft; and a rotating fan connected to the tilt hinge to rotate the camera with respect to a second axis perpendicular to the first axis, wherein the controller is further configured to:

activate an image shot of the camera module when the second body unit rotationally moves from a first position toward the first body unit such that an angle between the second body unit and the first body unit is equal to or smaller than a first angle and equal to or greater than a second angle;

deactivate the image shot of the camera module when the angle between the second body unit and the first body unit is smaller than the second angle; and cause the display unit to display an image captured by the camera module when the second body returns toward the first position such that the angle between the second body unit and the first body unit becomes equal to or greater than the first angle.

2. The mobile terminal of claim 1, wherein if the second body unit rotationally moves between the first angle and the second angle, the controller activates a video shot of the camera module and wherein if the second body unit stops moving rotationally for a predetermined time between the first angle and the second angle, the controller activates a still image shot of the camera module.

3. The mobile terminal of claim 2, wherein in controlling the still image shot of the camera module, the controller controls still images to be captured in predetermined time intervals.

4. The mobile terminal of claim 1, wherein when the second body unit rotationally moves from an angle equal to or greater than the first angle to an angle equal to or smaller than the second angle, if it takes a time equal to or smaller than a setup time, the controller cancels the image shot of the camera module.

5. The mobile terminal of claim 1, wherein when the second body unit rotationally moves from an angle equal to or smaller than the first angle to an angle equal to or greater than the second angle, the controller activates the image shot of the camera module from a timing point of recognizing a face of a character.

6. The mobile terminal of claim 1, wherein when the second body unit rotationally moves from an angle equal to or smaller than the first angle to an angle equal to or greater than the second angle, the controller activates the image shot of the camera module from a timing point of recognizing a voice for an image shot start command.

7. The mobile terminal of claim 1, wherein when the second body unit rotationally moves from an angle equal to or smaller than the first angle to an angle equal to or greater than the second angle, the controller activates the image shot of the camera module in a predetermined time interval.

8. The mobile terminal of claim 1, wherein when the second body unit rotationally moves from an angle equal to or smaller than the first angle to an angle equal to or greater than the second angle, the controller activates the image shot of the camera module consecutively.

9. The mobile terminal of claim 1, wherein the first angle and the second angle corresponding to a rotational movement angle of the second body unit is changed and set by a user.

10. The mobile terminal of claim 1, the camera module comprising:

a first camera disposed in X-axis direction in parallel with a rotating shaft of the second body unit; and a second camera disposed in Y-axis direction vertical to the rotating shaft of the second body unit.

11. The mobile terminal of claim 10, wherein if the angle between the second body unit and the first body unit is the second angle, the controller activates the image shot of each of the first camera and the second camera.

12. The mobile terminal of claim 10, wherein the second body unit comprises a gyroscope sensor and wherein if the angle between the second body unit and the first body unit is the second angle, the controller activates the image shot selected from the first camera and the second camera in response to a sensing signal of the gyroscope sensor.

13. The mobile terminal of claim 10, wherein the second body unit comprises a gyroscope sensor and wherein if the angle between the second body unit and the first body unit is the second angle, the controller activates the image shot selected from the first camera and the second camera from a timing point of changing a location and direction of a face of a character or recognizing a face of a new character.

14. The mobile terminal of claim 1, wherein the controller displays an image shot list captured by the camera module on the display unit.

15. The mobile terminal of claim 14, wherein the controller distinguishably displays the image shot list, which is captured by the camera module when the angle between the second body unit and the first body unit is equal to or smaller than the first angle and equal to or greater than the second angle, and the image shot list, which is captured by the camera module when the angle between the second body unit and the first body unit is the second angle, on the display unit.

16. The mobile terminal of claim 14, wherein when a video captured by the camera module is displayed on the display unit, the controller displays a timing point of capturing a still image on a timeline of the video.

17. The mobile terminal of claim 14, wherein the controller selectively saves a multitude of still images and videos captured by the camera according to user editing.

18. The mobile terminal of claim 1, wherein the first angle is greater than the second angle.

19. The mobile terminal of claim 1, wherein the tilt of the camera increases gradually as the angle between the second body unit and the first body unit decreases gradually.

20. The mobile terminal of claim 1, further comprising a mirror film disposed on the rear side of the second body unit to project a shot-desired image.

* * * * *